United States Patent
Wang et al.

(10) Patent No.: US 10,841,564 B2
(45) Date of Patent: Nov. 17, 2020

(54) THREE DIMENSIONAL SCAN SYSTEM THAT CAN INCREASE THE EFFECTIVE SCAN DEPTH

(71) Applicant: QISDA CORPORATION, Taoyuan (TW)

(72) Inventors: Ching-Huey Wang, Hsinchu County (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/365,701

(22) Filed: Mar. 27, 2019

(65) Prior Publication Data

US 2019/0320160 A1    Oct. 17, 2019

(30) Foreign Application Priority Data

Apr. 17, 2018  (CN) .......................... 2018 1 0342673
Aug. 21, 2018  (CN) .......................... 2018 1 0956014

(51) Int. Cl.
*H04N 13/254*  (2018.01)
*G01B 11/25*  (2006.01)
*G03B 21/14*  (2006.01)

(52) U.S. Cl.
CPC ....... *H04N 13/254* (2018.05); *G01B 11/2518* (2013.01); *G03B 21/142* (2013.01)

(58) Field of Classification Search
CPC . G01B 11/2518; G01B 11/25; G01B 11/2513; G01B 11/24; G01B 11/2531; G01B 11/254; G06T 7/521; G06T 15/00; A61B 5/4547; A61B 5/1077; A61B 1/00186; A61B 1/00172; A61B 1/00188; A61B 1/042; A61B 1/0669; A61B 1/0684; A61B 1/247; A61C 9/006; A61C 9/0053
USPC .................................. 356/601–623; 382/154
See application file for complete search history.

(56) References Cited

U.S. PATENT DOCUMENTS

| | | | | |
|---|---|---|---|---|
| 7,477,402 | B2* | 1/2009 | Babayoff ........... | A61B 1/00096 356/609 |
| 8,280,152 | B2* | 10/2012 | Thiel .................... | A61B 5/0064 382/154 |
| 10,386,177 | B1* | 8/2019 | Tewes ................. | A61B 5/0068 |
| 2004/0125381 | A1* | 7/2004 | Chen ..................... | G01B 11/25 356/603 |
| 2007/0086762 | A1* | 4/2007 | O'Keefe ............... | A61B 1/247 396/16 |

(Continued)

FOREIGN PATENT DOCUMENTS

CN    107624047 A    1/2018

*Primary Examiner* — Hoa Q Pham

(57) ABSTRACT

A three dimensional scan system includes a projection device, an image capturing module and an image formation device. The projection device includes a lighting module for providing a light beam, and a pattern generator for receiving the light beam and project a predetermined pattern. The image capturing module is used to capture images. The image formation device is used to form a projected pattern by projecting the predetermined pattern onto an object, and to project an image of the object and the projected pattern to the image capturing module. An optimal image formation focal plane of the image formation device for forming the predetermined pattern is different from an optimal image capturing focal plane of the image formation device for projecting the projected pattern.

14 Claims, 4 Drawing Sheets

(56) References Cited

U.S. PATENT DOCUMENTS

| | | | |
|---|---|---|---|
| 2008/0024793 A1* | 1/2008 | Gladnick | G01B 11/007 356/603 |
| 2014/0022356 A1* | 1/2014 | Fisker | H04N 13/204 348/47 |
| 2015/0029309 A1* | 1/2015 | Michaeli | G02B 21/0028 348/46 |
| 2015/0164621 A1* | 6/2015 | Rubbert | A61B 1/00193 433/29 |
| 2016/0022389 A1* | 1/2016 | Esbech | A61C 9/0073 250/208.1 |
| 2016/0113742 A1* | 4/2016 | Lampert | G01B 11/2513 356/609 |
| 2018/0125337 A1* | 5/2018 | Thiel | A61B 1/00172 |

* cited by examiner

THREE DIMENSIONAL SCAN SYSTEM THAT CAN INCREASE THE EFFECTIVE SCAN DEPTH

BACKGROUND OF THE INVENTION

1. Field of the Invention

The present invention is related to a three dimensional scan system, and more particularly, to a three dimensional scan system that can increase the effective scan depth.

2. Description of the Prior Art

A scan device can be used to build a 3D model of an object and can be applied in many different fields. For example, animators can use a scan device to build the 3D model of an object to save the time spent for manual drawing. Another example, dental technicians can use a scan device to get the 3D model of a patient's tooth to produce a dental prosthesis. In the prior art, a scan device can build a 3D model by projecting a light beam with a fixed pattern to an object and reading the light pattern reflected from the object. Because the surface of the object can have textures, the pattern reflected from the object would be different from the projected pattern. The scan device can build its 3D model according the characteristics of the object received from the difference of the patterns.

However, limited by the physical nature of device components, although a scan device can resolve effective depth information under specific depth of field, it can only get less accurate depth information outside that depth of field. The scan result then cannot be used in further application. In the prior art, if a user wants to increase the effective depth of field, he needs to adapt corresponding physical components for the scan device. Therefore, it not only requires higher cost for hardware but is also less flexible in manufacturing process.

SUMMARY OF THE INVENTION

An embodiment discloses a three dimensional scan system comprising a projection device, an image capturing module and an image formation device. The projection device comprises a lighting module for providing a light beam, and a pattern generator for receiving the light beam and project a predetermined pattern. The image capturing module is used to capture images. The image formation device is used to form a projected pattern by projecting the predetermined pattern onto an object, and to project an image of the object and the projected pattern to the image capturing module. An optimal image formation focal plane of the image formation device for forming the predetermined pattern is different from an optimal image capturing focal plane of the image formation device for projecting the projected pattern.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
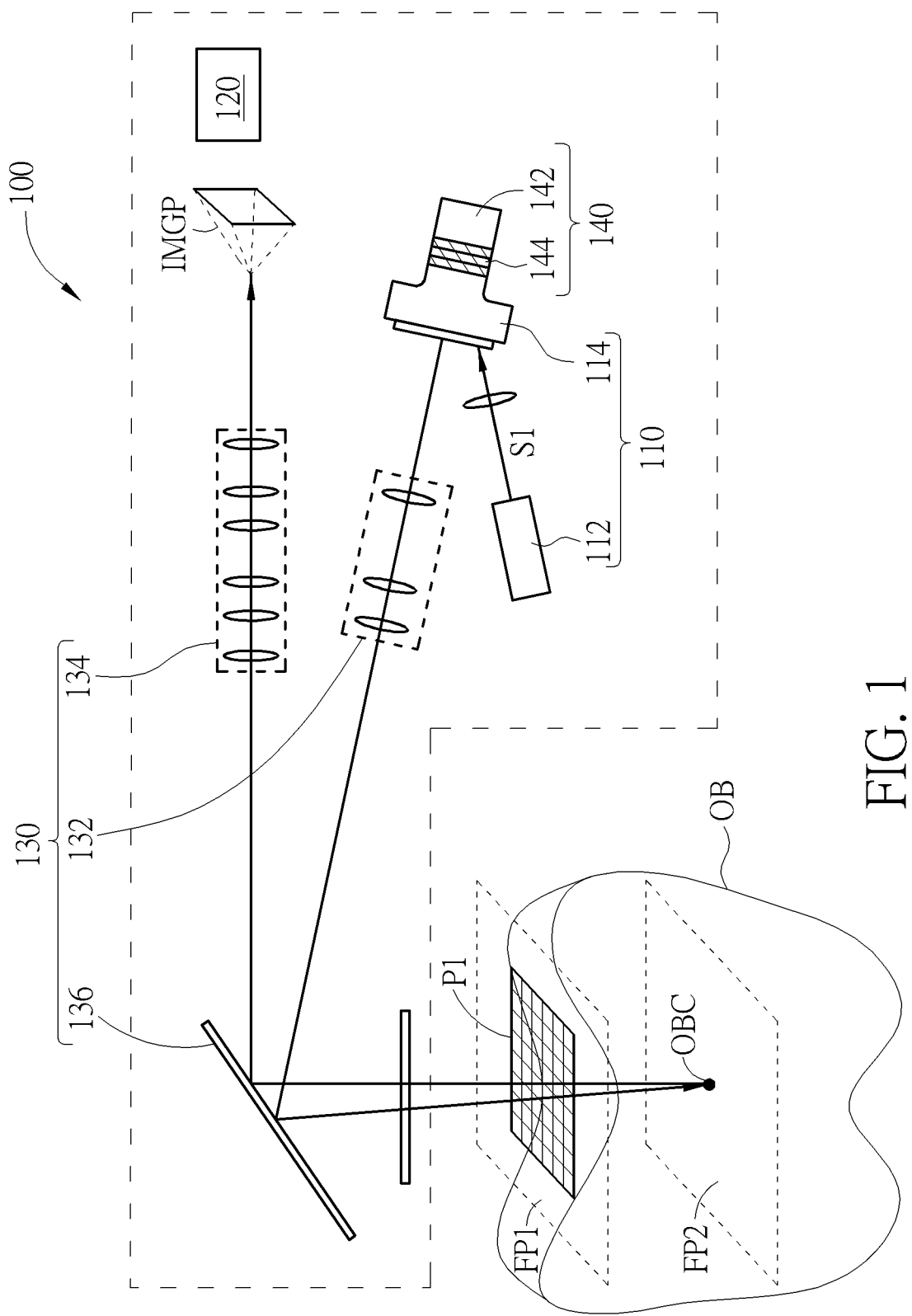
FIG. 1 is a diagram of an embodiment of a three dimensional scan system according to the present invention.

FIG. 1 is a diagram of an embodiment of a three dimensional scan system 100 according to the present invention. The three dimensional scan system 100 comprises a projection device 110, an image capturing device 120 and an image formation device 130.

The projection device 110 comprises a lighting module 112 and a pattern generator 114. The lighting module 112 can provide a light beam S1. The pattern generator 114 comprises a digital micromirror device (DMD), a dynamic grating generator or a static grating generator to project a predetermined pattern P1. The predetermined pattern P1 may be a square pattern but is not limited thereto.

The image formation device 130 can project the predetermined pattern P1 on the object OB to form a projected pattern. Then, the image formation device 130 would project an image IMGP, which includes an image of the object OB and the projected pattern, to the image capturing device 120. The image capturing device 120 is then able to capture the projected image IMGP. The projected image IMGP would include the projected pattern on the object OB.

On FIG. 1, when the image formation device 130 is projecting the predetermined pattern P1, according to its physical properties, it will have the highest resolution on an optimal image formation focal plane FP1. On the optimal image formation focal plane FP1, the image formation device 130 would most clearly present the predetermined pattern P1. Further, when the image formation device 130 is capturing the projected pattern, it would have the best image resolution ability on an optimal image capturing focal plane FP2. On the optimal image capturing focal plane FP2, the image formation device 130 can get the clearest image.

Figure 2:
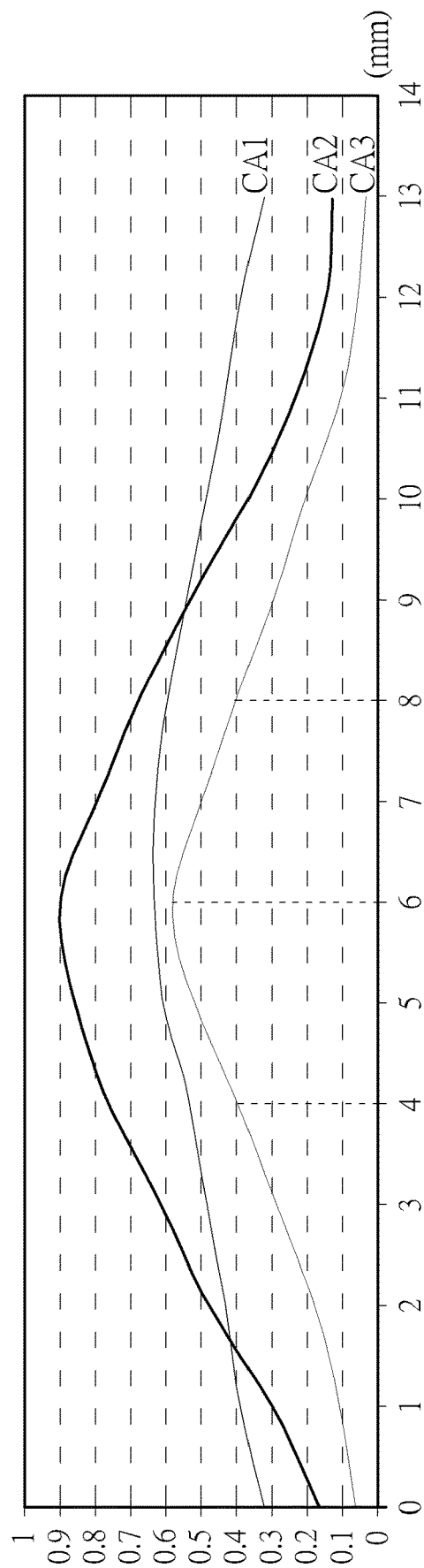
FIG. 2 shows modulation transfer function curves of a three dimensional scan system according to prior art.

In the prior art, the optimal image formation focal plane and the optimal image capturing focal plane would overlap. Therefore, the image capturing module can capturing the clearest image with the best image resolution. FIG. 2 shows modulation transfer function (MTF) curves CA1, CA2, CA3 of a prior three dimensional scan system during projection, capturing and scan. The horizontal axis is depth of field, and the vertical axis is the image resolution ability. In FIG. 2, because the optimal image formation focal plane and the optimal image capturing focal plane overlaps for the prior image formation device, the projection ability curve CA1 and image capturing curve CA2 would have peaks at 6 mm depth of field. Because the final image resolution ability of the scan is the multiplier of projection and capturing, the scan ability curve CA3 would also have a peak at 6 mm depth of field. The scan ability curve CA3 would also have a sharper shape. If the image processing following the scan can only process an image resolution ability greater than 0.4, practically the prior three dimensional scan system can only effectively scan objects with depth of field between 4 mm and 8 mm.

However, for the embodiment in FIG. 1, the optimal image formation focal plane FP1 and the optimal image capturing focal plane FP2 for the image formation device 130 are two different planes. The optimal image formation focal plane FP1 and the optimal image capturing focal plane FP2 for the image formation device 130 do not overlap. FIG.

3 shows modulation transfer function (MTF) curves CB1, CB2, CB3 of the three dimensional scan system 100 during projection, capturing and scan. The horizontal axis is depth of field, and the vertical axis is the image resolution ability.

Figure 3:
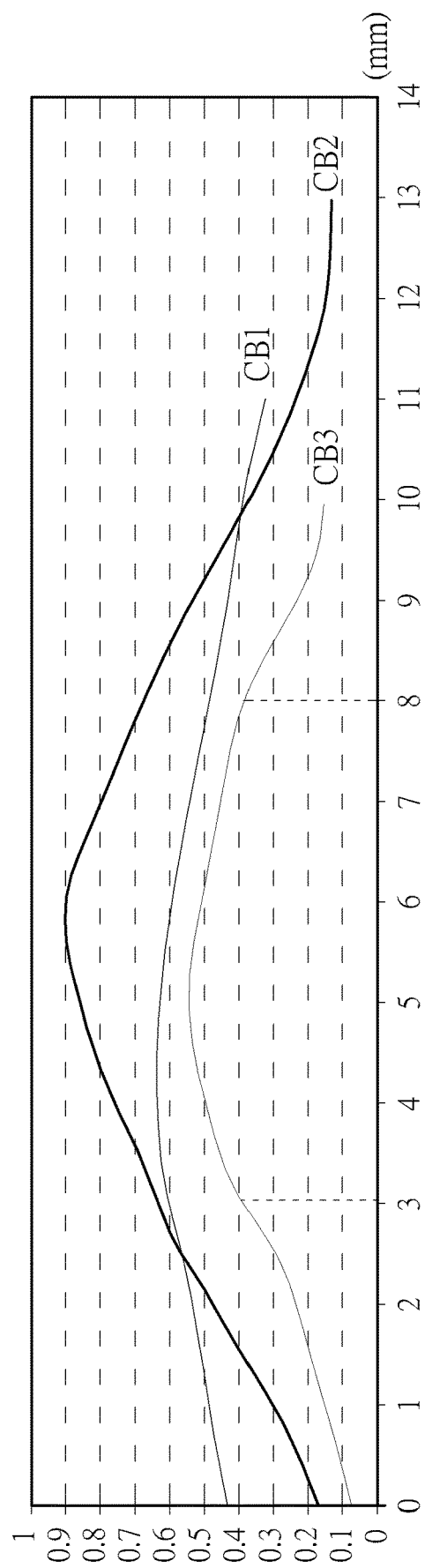
FIG. 3 shows modulation transfer function curves of the three dimensional scan system in FIG. 1.

In FIG. 3, because the optimal image formation focal plane FP1 and the optimal image capturing focal plane FP2 for the image formation device 130 do not overlap, the projection ability curve CB1 and the image capturing curve CB2 would have peaks at different depth of field. The scan ability curve CB3 then would have a flatter shape. Although the three dimensional scan system 100 cannot get the clearest image with the best resolution (The peak of curve CB3 is slightly lowered), in general, the three dimensional scan system 100 can effectively scan objects with greater depth of field. For example, the three dimensional scan system 100 can resolve objects with depth of field 3 mm to 8 mm to match with the resolution ability of 0.4 required by the following process. It covers greater depth of field than that of the prior art, 4 mm to 8 mm.

For some embodiment of this invention, the optimal image formation focal plane FP1 and the optimal image capturing focal plane FP2 for the image formation device 130 do not overlap. In order to get a relatively clear image, the optimal image formation focal plane FP1 and the optimal image capturing focal plane FP2 for the image formation device 130 can be in parallel.

The main function of the three dimensional scan system 100 is to get the depth information of objects to generate its 3D model. Practically, if the three dimensional scan system 100 can provide a resolution required by the system, it can calculate useful depth information and do not need to emphasize image resolution of partial depth of field. By separating the optimal image formation focal plane FP1 and the optimal image capturing focal plane FP2 for the image formation device 130, the three dimensional scan device 130 can increase the range of effective scan depth without changing the projection device 110 and the image capturing module 120. The three dimensional scan system 100 can effectively scan objects with a greater depth of field difference and build the corresponding 3D model.

For the embodiment of this invention, the image formation device 130 can be designed to set its predetermined scan center on the optimal image capturing focal plane FP2. When a user adjusts the distance between the three dimensional scan system 100 and the object OB, a center OBC of the object OB would be near the optimal image capturing formation plane FP2. For example, the predetermined scan center can be set to 5 mm depth, and for the embodiment in FIG. 1, the center OBC of the object OB is overlapping with the predetermined scan center. Further, the distance between the optimal image formation focal plane FP1 and the predetermined scan center would be greater than the distance between the optimal image capturing focal plane FP2 and the predetermined scan center. For example, in FIG. 1 the center OBC of the object would fall on the optimal image capturing focal plane FP2. The optimal image formation focal plane FP1 would be above the optimal image capturing focal plane FP2, which is a more shallow position on the object OB. But the invention is not limited to this embodiment. In other embodiments according to the need of the system, the optimal image formation focal plane FP1 can be placed below the optimal image capturing focal plane FP2, which is a deeper position of the object OB.

Under this condition, although the projected pattern might be slightly blurred on the center OBC, the image capturing module 120 would be able to clearly capture the blurred projected pattern on the center OBC. In other words, the blurred edge of the received image in three dimensional scan system 100 is mainly due to the process of projecting the predetermined pattern P1 and not the process of capturing the projected pattern. Therefore, the three dimensional scan system 100 can optimize the blurred edge through a follow-up image processing to generate more accurate object depth information.

In the application of three dimensional scan, in order to optimize the image through image processing, the priority is to let the process of capturing the projected pattern having a higher resolution. In some embodiment of this invention, the F-number of the projection device 110 and the image formation device 130 can be greater than the F-number of the image capturing module 110 and the image formation device 130. In other words, aperture of the projection device 110 and the image formation device 130 during projection can be less than or equal to aperture of the image capturing module 120 and the image formation device 130 during image capturing. In some other words, the image forming resolution of the projection device 110 and the image formation device 130 can be less than or equal to the image capturing resolution of the image capturing module 120 and the image formation device 130.

In FIG. 1, the image formation device 130 comprises an image projection formation module 132, an image capturing formation module 134 and a reflecting element 136. The image projection formation module 132 can project the predetermined pattern P1 through the reflecting element 136 to form the projected pattern on the object OB. The light beam reflected by the object OB would enter into the image capturing formation module 134, which then would form the image IMGP on the image capturing module 120. In the embodiment of FIG. 1, the image formation device 130 can project the predetermined pattern P1 through the image projection formation module 132 and capture the image of the object OB and the projected pattern through the image capturing formation module 134. The image projection formation module 132 and the image capturing formation module 134 can each include a set of lenses required to form the projected pattern and projected image IMGP on the desired position. The image projection formation module 132 and the image capturing formation module 134 can have different optical axes.

The three dimensional scan system 100 comprises an adjustment gear 140. In FIG. 1, the pattern generator 114 is bearing on the adjustment gear 140. The adjustment gear 140 can adjust the distance between the pattern generator 114 and the image projection formation module 132 to move the position of the optimal image formation plane FP1. The adjustment gear 140 comprises a bearing element 142 and at least a washer 144. When manufacturing the three dimensional scan system 100, the number of washers 144 on the bearing element 142 can be modified to adjust the position of the optimal image formation focal plane FP1. When the number of washers 144 decreases, the pattern generator 114 would be further away from the image projection formation module 132. The optimal image formation focal plane FP1 would then be closer to the three dimensional scan system 100. On the contrary, when the number of washers 144 increases, the pattern generator 114 would be closer to the image projection formation module 132. The optimal image formation focal plane FP1 would then be further away from the three dimensional scan system 100. With this mechanism, when manufacturing the three dimensional scan system 100, the number of washers 144 can be adjusted to calibrate the system according to the need. This mechanism would make design and production process more flexible.

Further, this invention is not limited to using a position bearing element 142 and the washer 144 to adjust the adjustment gear 140. In other embodiment of this invention, the adjustment gear 140 can include a rotatable screw instead of the least one washer 144. The pattern generator 114 can bear on the rotatable screw. By rotating the screw, the distance between the pattern generator 114 and the image projection formation module 132 can be adjusted to move the position of the optimal image formation focal plane FP1. The adjustment gear 140 can also bear on the image projection formation module 132 to adjust the distance between the pattern generator 114 and the image projection formation module 132 to move the position of the optimal image formation focal plane FP1. In practice, in order to avoid block the light projection path, the position bearing element 142 and the washer 144 should be ring shape or the rotatable screw should be positioned outside of the light projection path.

For the embodiment in FIG. 1, the image formation device 130 can comprise the image projection formation module 132 and the image capturing formation module 134 with different optical axes. But in other embodiments of the invention, the image formation device can also project and capture image with the same set of lenses and optical axis.

Figure 4:
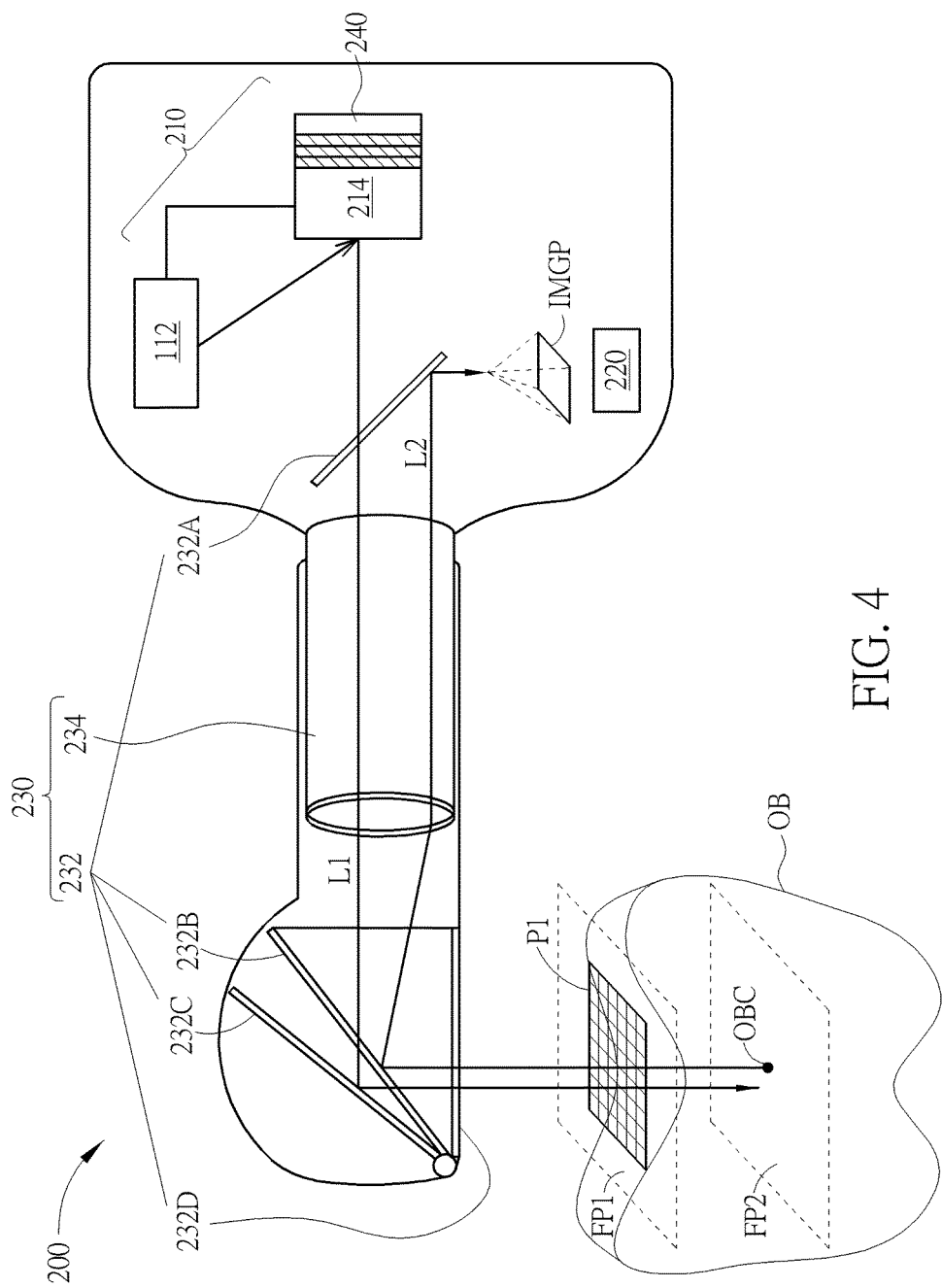
FIG. 4 is another embodiment of the three dimensional scan system according to the present invention.

FIG. 4 is a diagram of another embodiment of a three dimensional scan system 200 according to the present invention. The three dimensional scan systems 100 and 200 have similar structures and operating principles. The main difference of the two is that the three dimensional scan system 200 comprises a light splitting module 232 and a lens module 234. The lens module 234 can propagate the predetermined pattern P1 and the projected pattern. The light splitting module 232 can separate the projecting path of the predetermined pattern P1 to the object OB and the projecting path of the projected pattern to the image capturing module 220.

The light splitting module 232 comprises light splitting elements 232A and 232B, a reflecting element 232C and a quarter wave plate 232D. The light splitting elements 232A and 232B can allow a specific polarized light beam to pass through and reflect a light beam with perpendicular polarization to that polarized beam. The quarter wave plate 232D can change the polarization of light beam passing through by 45 degrees. Under this condition, a light beam L1 projected by the projection device 210 would first pass through the light splitting element 232A and then reflected by the reflecting element 232C. It would then pass through the light splitting element 232B and the quarter wave plate 232D. It would finally form the projected pattern on the object OB. The light beam L1 by the projection device 110 projected on the object OB after reflection would produce a reflecting light beam L2. The light beam L2 would first pass through the quarter wave plate 232D. At this moment, the polarized direction of L1 and L2 would be perpendicular. The light splitting elements 232A and 232B would both reflect the light beam L2 to let the image capturing module 220 capture the projected image IMGP at a different position from the projection device 210.

By adapting the light splitting module 232, the three dimensional scan system 200 can use a single lens set in the lens module 234. As a result, the process of projection and image capturing can share the lens module 234 and the same optical axis.

Further, for the embodiment in FIG.4, the three dimensional scan system 200 comprises an adjustment gear 240. The pattern generator 214 is bearing on the adjustment gear 240 and the adjustment gear 240 can adjust the distance between the pattern generator 214 and the lens module 234 to move the position of the optimal image formation focal plane FP1. The way to adjust the adjustment gear 140 is the same as the way to adjust the adjustment gear 240. A rotatable screw or washers can be used or it can use other elements according the system requirement. Therefore, when manufacturing the three dimensional scan system 100, the adjustment gear 240 can be adjusted to calibrate the system according to the need. This mechanism would make design and production process more flexible.

In summary, the three dimensional scan system provided by the embodiments of this invention have different optimal image formation focal plane and optimal image capturing focal plane. As a result, it increases the effective scan depth of field. Further, by the adjustment gear, the calibration process during production is simplified to make design and production process more flexible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three dimensional scan system comprising:
a projection device comprising:
a light source configured to provide a light beam; and
a pattern generator configured to receive the light beam and project a predetermined pattern;
an image capturing sensor configured to capture images; and
an image formation optics configured to form a projected pattern by projecting the predetermined pattern onto an object, and to project an image of the object and the projected pattern to the image capturing sensor;
wherein an optimal image formation focal plane of the image formation optics for forming the predetermined pattern is different from an optimal image capturing focal plane of the image formation optics for projecting the projected pattern.

2. The three dimensional scan system of claim 1, wherein a distance between the optimal image formation focal plane and a predetermined scan center of the three dimensional system is greater than a distance between the optimal image capturing focal plane and the predetermined scan center.

3. The three dimensional scan system of claim 2, wherein the predetermined scan center is substantially on the optimal image capturing focal plane.

4. The three dimensional scan system of claim 1, wherein an F-number for the projection device and the image formation optics to project the predetermined pattern is greater than or equal to an F-number for the image capturing sensor and the image formation optics to capture the projected pattern.

5. The three dimensional scan system of claim 1, wherein a resolution for projecting an image by the projection device and the image formation optics is less than or equal to a resolution for capturing an image by the image formation optics and the image capturing sensor.

6. The three dimensional scan system of claim 1, wherein the image formation optics comprises:
an image projection lens set configured to project the predetermined pattern on the object;
an image capturing lens set configured to project the projected pattern on the image capturing sensor;
wherein the image projection lens set and the image capturing lens set have different optical axes.

7. The three dimensional scan system of claim 6 further comprising an adjustment gear, wherein the pattern generator is bearing on the adjustment gear and the adjustment gear is configured to adjust a distance between the pattern generator and the image projection lens set for adjusting a position of the optimal image formation focal plane.

8. The three dimensional scan system of claim 7, wherein the adjustment gear comprises a position bearing element and at least a washer.

9. The three dimensional scan system of claim 7, wherein the adjustment gear comprises a rotatable screw.

10. The three dimensional scan system of claim 1, wherein
the image formation optics comprises:
a light splitting optics configured to separate a projection path of the predetermined pattern onto the object and a projection path of the projected pattern onto the image capturing sensor;
a lens set configured to propagate the predetermined pattern and the projected pattern.

11. The three dimensional scan system of claim 10 comprising an adjustment gear wherein the pattern generator is bearing on the adjustment gear and the adjustment gear is configured to adjust a distance between the pattern generator and the lens set for adjusting a position of the optimal image formation focal plane.

12. The three dimensional scan system of claim 11, wherein the adjustment gear comprises a position bearing element and at least a washer.

13. The three dimensional scan system of claim 11, wherein the adjustment gear comprises at least a rotatable screw.

14. The three dimensional scan system of claim 1, wherein the optimal image formation focal plane and the optimal image capturing focal plane are in parallel.

* * * * *